US012464325B2

(12) United States Patent
Paczkowski

(10) Patent No.: US 12,464,325 B2
(45) Date of Patent: *Nov. 4, 2025

(54) USER CHARGING OVER AN EXPOSURE FUNCTION IN A WIRELESS COMMUNICATION NETWORK

(71) Applicant: T-MOBILE INNOVATIONS LLC, Overland Park, KS (US)

(72) Inventor: Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 289 days.

This patent is subject to a terminal disclaimer.

(21) Appl. No.: 18/364,124

(22) Filed: Aug. 2, 2023

(65) Prior Publication Data

US 2023/0379672 A1   Nov. 23, 2023

Related U.S. Application Data

(63) Continuation of application No. 17/740,081, filed on May 9, 2022, now Pat. No. 11,758,373, which is a continuation of application No. 17/160,715, filed on Jan. 28, 2021, now Pat. No. 11,395,111.

(51) Int. Cl.
*H04W 4/00* (2018.01)
*H04M 15/00* (2006.01)
*H04W 4/24* (2018.01)
*H04W 60/04* (2009.01)

(52) U.S. Cl.
CPC ............. *H04W 4/24* (2013.01); *H04M 15/66* (2013.01); *H04M 15/8214* (2013.01); *H04W 60/04* (2013.01)

(58) Field of Classification Search
CPC ....... H04W 4/24; H04W 60/04; H04M 15/66; H04M 15/8214
See application file for complete search history.

(56) References Cited

U.S. PATENT DOCUMENTS

| | | |
|---|---|---|
| 10,212,639 B2 | 2/2019 | Kodaypak |
| 10,491,376 B1 | 11/2019 | Suthar et al. |
| 10,524,166 B2 | 12/2019 | Youn et al. |
| 10,531,420 B2 | 1/2020 | Li et al. |
| 10,673,618 B2 | 6/2020 | Suthar et al. |
| 10,849,186 B2 | 11/2020 | Dao et al. |
| 11,412,418 B2 * | 8/2022 | Qiao ................... H04L 41/0894 |
| 11,463,856 B1 * | 10/2022 | Paczkowski ........ H04L 12/1407 |
| 2017/0317894 A1 | 11/2017 | Dao et al. |
| 2019/0342851 A1 | 11/2019 | Shan et al. |
| 2020/0022027 A1 | 1/2020 | Iwai et al. |

(Continued)

*Primary Examiner* — Pakee Fang

(57) ABSTRACT

A Network Exposure Function (NEF) charges a user for a wireless data service. The NEF exposes a service charge for the wireless data service to the user. The NEF receives a user request for the wireless data service at the service charge. The NEF directs a wireless communication network to deliver the wireless data service to the user in response to the user request. The NEF receives network data from the wireless communication network that indicates a delivery of the wireless data service to the user. The NEF exposes service data to the user in response to the network data. The service data characterizes the delivery of the wireless data service and indicates the service charge.

20 Claims, 9 Drawing Sheets

(56) References Cited

U.S. PATENT DOCUMENTS

| | | |
|---|---|---|
| 2020/0053802 A1 | 2/2020 | Li et al. |
| 2021/0044996 A1 | 2/2021 | Long |
| 2021/0076455 A1 | 3/2021 | Di Girolamo et al. |
| 2021/0385625 A1 | 12/2021 | Qiao et al. |
| 2022/0287036 A1* | 9/2022 | Mildh .................. H04W 72/56 |
| 2023/0247537 A1* | 8/2023 | Kweon ............... H04L 12/1403 |
| | | 370/329 |

* cited by examiner

USER CHARGING OVER AN EXPOSURE FUNCTION IN A WIRELESS COMMUNICATION NETWORK

RELATED CASES

This U.S. patent application is a continuation of U.S. patent application Ser. No. 17/740,081 that was filed on May 9, 2022 and is entitled "CHARGING OVER AN EXPOSURE FUNCTION IN A WIRELESS COMMUNICATION NETWORK." U.S. patent application Ser. No. 17/740,081 is hereby incorporated by reference into this U.S. patent application. U.S. patent application Ser. No. 17/740,081 is a continuation of U.S. Pat. No. 11,395,111 B1 that was filed on Jan. 28, 2021 and is entitled "USER CHARGING OVER AN EXPOSURE FUNCTION IN A WIRELESS COMMUNICATION NETWORK." U.S. Pat. No. 11,395,111 B1 is hereby incorporated by reference into this U.S. patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processors, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network elements in the network cores. Exemplary network elements include Access and Mobility Management Functions (AMFs), Session Management Functions (SMFs), User Plane Functions (UPFs), Network Exposure Functions (NEFs), and Application Functions (AFs).

NEFs expose network capabilities and events to AFs. The AFs securely interact with user application servers to exert user control over the wireless communication network. The exposed capabilities might indicate wireless data services and their Quality-of-Service (QoS). The exposed events might indicate service delivery and UE mobility. The user application servers use the AF to provision their wireless data services through the NEF. Thus, an AF may drive the NEF to provision a Protocol Data Unit (PDU) connection for a wireless user device. In some examples, the AF drives the NEF to control the entity that is charged for the wireless data service. Unfortunately, the NEF does not effectively support the actual charging of the user for the wireless data service—the NEF only controls who gets the charge. Moreover, the NEF does not efficiently serve detailed session data—including service charges—promptly upon session delivery.

TECHNICAL OVERVIEW

In some examples, a Network Exposure Function (NEF) charges a user for a wireless data service. The NEF exposes a service charge for the wireless data service to the user. The NEF receives a user request from the user for the wireless data service at the service charge. The NEF directs a wireless communication network to deliver the wireless data service to the user in response to the user request. The NEF receives network data from the wireless communication network that indicates a delivery of the wireless data service to the user. The NEF exposes service data to the user in response to the network data. The service data characterizes the delivery of the wireless data service and indicates the service charge.

In some examples, a wireless communication network charges a user for a wireless data service. The wireless communication network comprises a NEF and an Application Function (AF). The NEF transfers a service charge for the wireless data service to the AF. The AF receives the service charge for the wireless data service from the NEF and transfers the service charge for the wireless data service to a user Application Server (AS). The AF receives a user request for the wireless data service at the service charge from the user AS and transfers the user request for the wireless data service at the service charge to the NEF. The NEF receives the user request for the wireless data service at the service charge from the AF. The NEF signals one or more network functions to deliver the wireless data service to a User Equipment (UE). The NEF receives network data from the network functions that indicates the delivery of the wireless data service to the UE. The NEF transfers service data to the AF that characterizes the delivery of the wireless data service to the UE and that indicates the service charge. The AF receives the service data from the NEF that characterizes the delivery of the wireless data service to the UE and that indicates the service charge. The AF transfers the service data to the user AS that characterizes the delivery of the wireless data service to the UE and that indicates the service charge.

DETAILED DESCRIPTION

Figure 1:
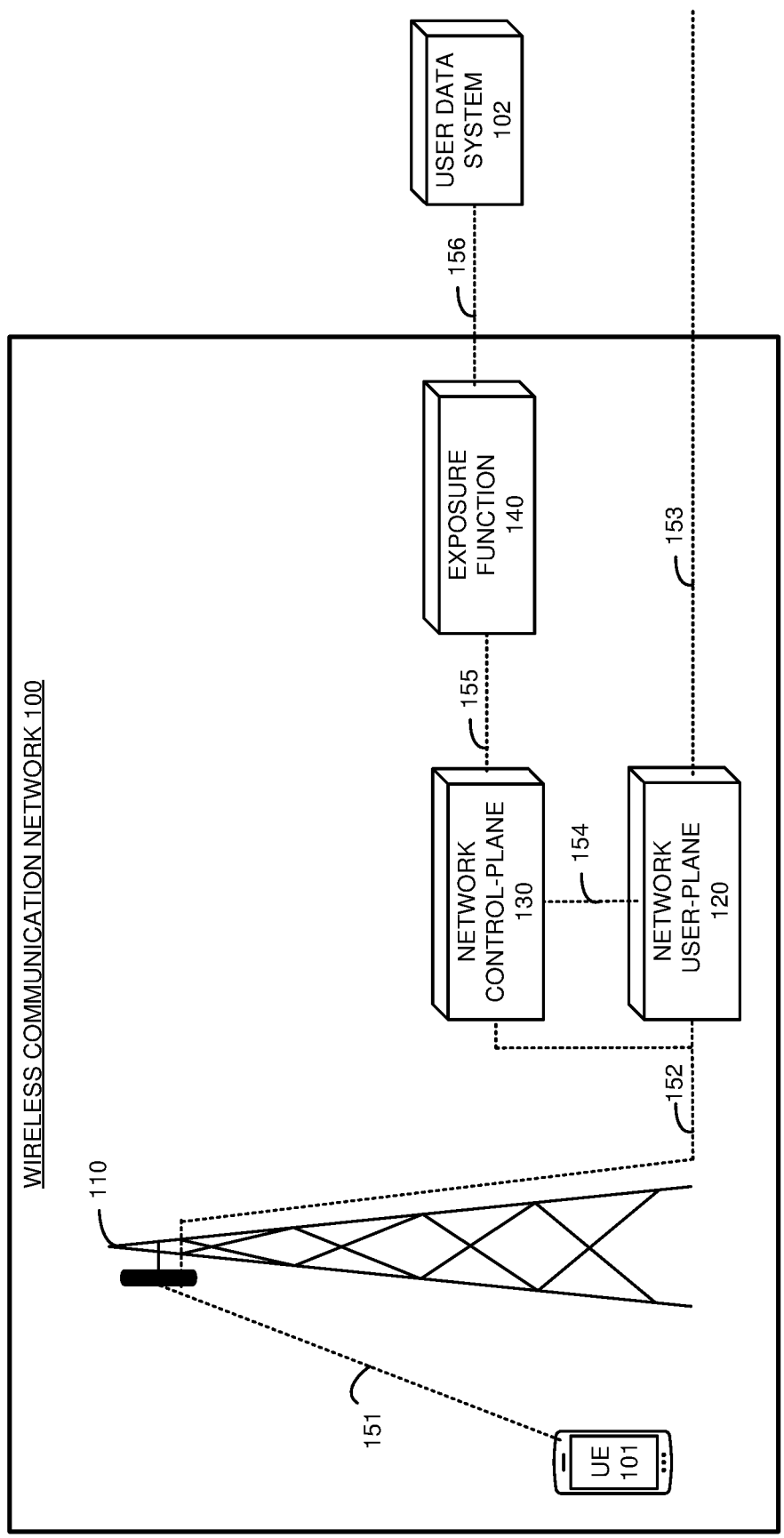
FIG. 1 illustrates a wireless communication network to charge a user over an exposure function for a wireless data service.

FIG. 1 illustrates wireless communication network 100 to charge a user for a wireless data service over exposure function 140. Wireless communication network 100 delivers a wireless data service to UE 101 like internet-access, machine communications, media-conferencing, or some other wireless network data product. Wireless communication network 100 comprises wireless UE 101, Radio Access Network (RAN) 110, network user-plane 120, network control-plane 130, and exposure function 140. The number of UEs and RANs that are depicted on FIG. 1 has been restricted for clarity, and wireless communication network 100 may comprise many more UEs and RANs.

Various examples of network operation and configuration are described herein. In some examples, exposure function 140 exposes a service capability and a service charge to user data system 102. The service charge comprises a monetary amount or a similar value like an amount of credits that have a corresponding monetary amount. Exposure function 140 receives a request for the service capability at the service charge from user data system 102, and in response, exposure function 140 maps the service capability into network parameters and transfers the network parameters to network control-plane 130. Network control-plane 130 receives and translates the network parameters into network signaling. Network control-plane 130 transfers the network signaling to network user-plane 120. Network user-plane 120 exchanges user data with UE 101 over RAN 110 in response to the network signaling. Network user-plane 120 transfers session data that characterizes the user data transfer to network control-plane 130. Network control-plane 130 transfers the session data to exposure function 140. Exposure function 140 maps the session data into a service delivery event that characterizes the user data transfer. Exposure function 140 exposes the service delivery event to user data system 102 to indicate the service capability and the service charge. Advantageously, NEF 140 effectively charges user data system 102 for the wireless data service that was delivered to UE 101. Moreover, NEF 140 efficiently serves detailed session data to user data system 102 promptly upon session delivery.

In some examples, exposure function 140 receives a capability event subscription from user data system 102 and responsively indicates the service capability to user data system 102. In response, exposure function 140 receives a request for the service capability and a service delivery event subscription from user data system 102. Exposure function 140 maps the session data into the service delivery event in response to the service capability request and the service delivery event subscription. Exposure function 140 may expose a charging capability to user data system 102 and receive a charging capability request and a charging event subscription from user data system 102. Exposure function 140 maps the session data into the service delivery event that indicates the service charge to user data system 102 in response to the charging capability request and the charging event subscription. Exposure function 140 may expose a session detail capability to user data system 102 and receive a detail capability request and a detail event subscription from user data system 102. Exposure function 140 maps the session data into the service delivery event that exposes session details to user data system 102 in response to the detail capability request and the detail event subscription. Exposure function 140 may expose a payment capability to user data system 102 and receive payment capability request and a payment event subscription from user data system 102. Exposure function 140 receives a user payment indication—possibly from another AF that hosts financial transaction data. Exposure function 140 maps the session data into the service delivery event that indicates the user payment event to user data system 102 in response to the payment capability request and the payment event subscription. Exposure function 140 may expose a wireless network slice capability to user data system 102 and receive slice capability request and a slice event subscription from user data system 102. Exposure function 140 maps the session data into the service delivery event that indicates the wireless network slice in response to the slice capability request and the slice event subscription. Exposure function 140 may expose a wireless network policy to user data system 102 and receive policy capability request and a policy event subscription from user data system 102. Exposure function 140 maps the session data into the service delivery event that indicates the wireless network policy in response to the policy capability request and the policy event subscription.

UE 101 and RAN 110 wirelessly communicate over wireless link 151 using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. RAN 110 communicates with network user-plane 120 and network control-plane 130 over backhaul links 152 that use metallic links, glass fibers, radio channels, or some other communication media. Links 152-156 use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, Fifth Generation Core (5GC), virtual switching, inter-processor communication, bus interfaces, and/or some other data communication protocols.

UE 101 comprises a vehicle, sensor, robot, computer, phone, or some other data appliance with wireless communication circuitry. RAN 110 is depicted as a tower but RAN 110 may use other mounting structures or no mounting structures at all. RAN 110 may comprise gNodeBs, eNodeBs, NB-IoT access nodes, LP-WAN base stations, wireless relays, and/or some other wireless network transceivers. UE 101 and RAN 110 comprise antennas, amplifiers, filters, modulation, and analog/digital interfaces. UE 101, RAN 110, user-plane 120, control-plane 130, and exposure function 140 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein. In some examples, user-plane 120, control-plane 130, and exposure function 140 comprise Virtual Network Functions (VNFs) that are hosted by a Network Function Virtualization Infrastructure (NFVI).

Figure 2:
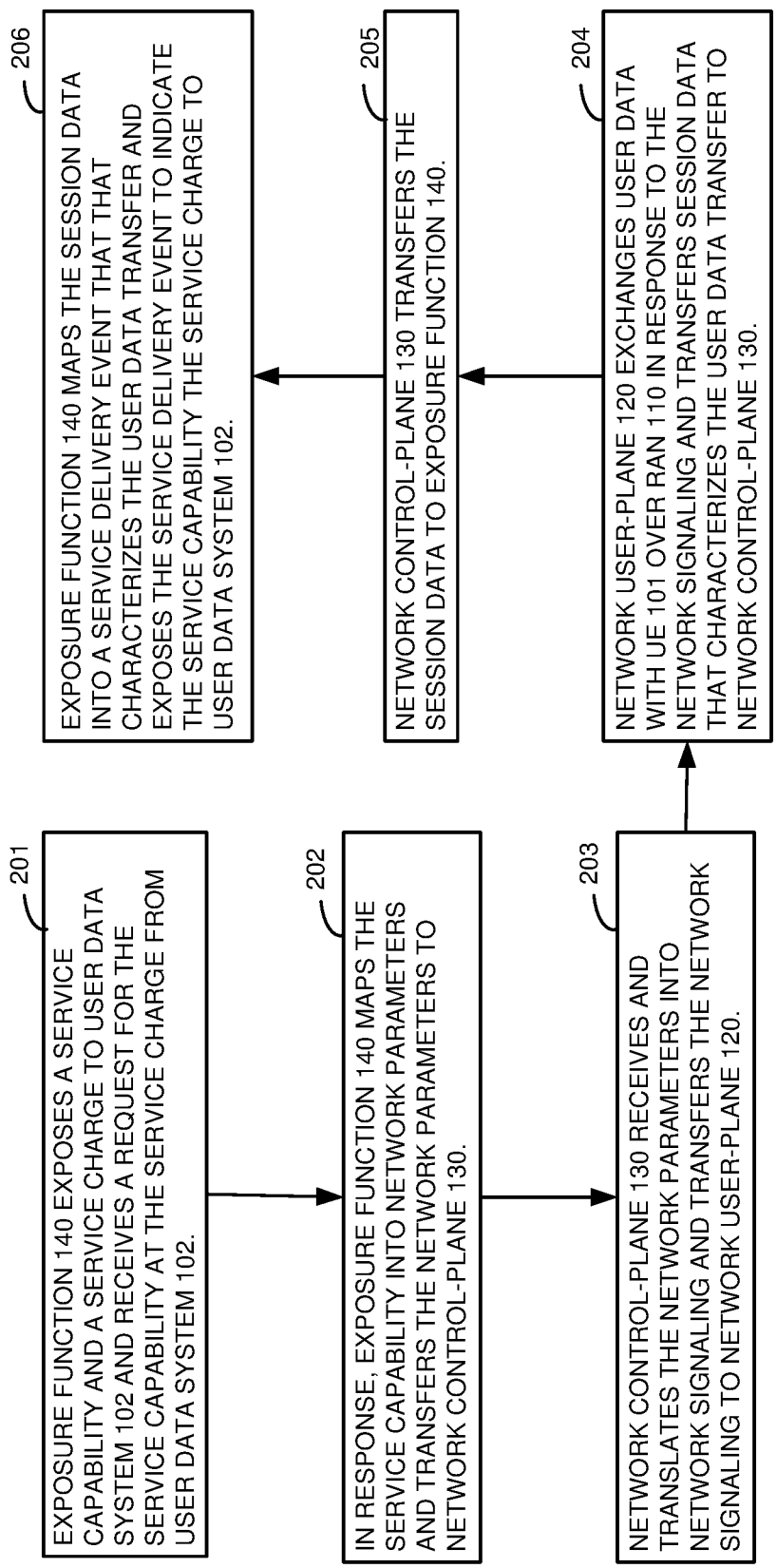
FIG. 2 illustrates the operation of the wireless communication network to charge the user over the exposure function for the wireless data service.

FIG. 2 illustrates the operation of wireless communication network 100 to charge the user for the wireless data service over exposure function 140. The operation is exemplary and may vary in other examples. Exposure function 140 exposes a service capability and a service charge to user data system 102 and receives a request for the service capability at the service charge from user data system 102 (201). In response, exposure function 140 maps the service capability into network parameters and transfers the network parameters to network control-plane 130 (202). Network control-plane 130 receives and translates the network parameters into network signaling and transfers the network signaling to network user-plane 120 (203). Network user-plane 120 exchanges user data with UE 101 over RAN 110 in response to the network signaling (204). Network user-plane 120 transfers session data that characterizes the user data transfer to network control-plane 130 (204). Network control-plane 130 transfers the session data to exposure function 140 (205). Exposure function 140 maps the session data into a service delivery event that characterizes the user data transfer (206). Exposure function 140 exposes the service delivery event to user data system 102 to indicate the service capability the service charge (206).

Figure 3:
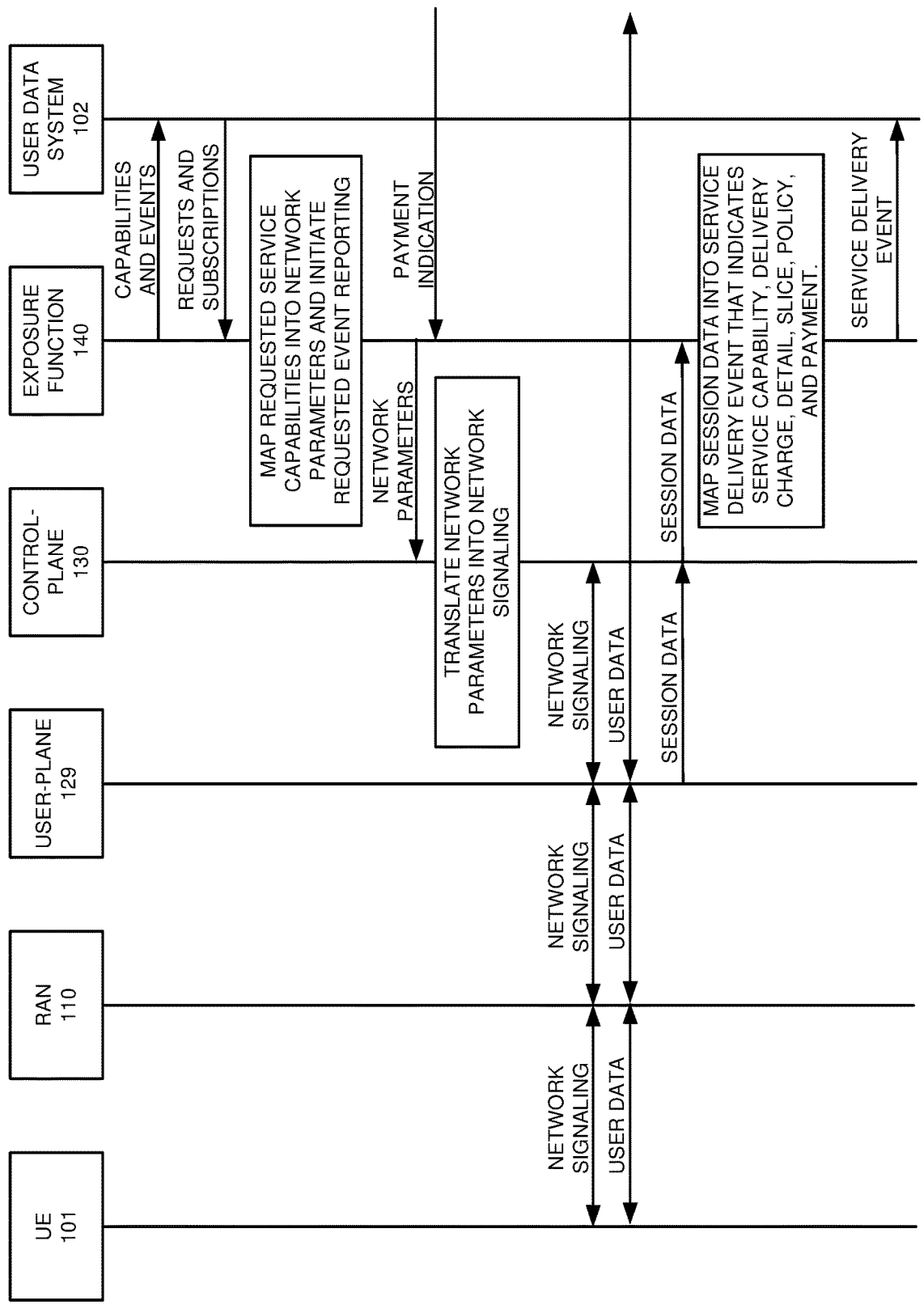
FIG. 3 illustrates the operation of the wireless communication network to charge the user over the exposure function for the wireless data service.

FIG. 3 illustrates the operation of wireless communication network 100 to charge the user for the wireless data service over exposure function 140. The operation is exemplary and may vary in other examples. Exposure function 140 initially exposes capabilities and events to user data system 102 for services, charging, session detail, and payment. Exposure function 140 receives capability requests and event subscriptions for a service, charging, session detail, and payment. Exposure function 140 maps the requested capabilities into network parameters and transfers the network parameters to network control-plane 130. Exposure function 140 initiates the requested event reporting. Exposure function 140 receives a payment indication for UE 101—possibly from an Application Function (AF) with financial transaction information. Network control-plane 130 receives the network parameters from exposure function 140. Network control-plane 130 and translates the network parameters into network signaling and exchanges network signaling with network user-plane 120. Network user-plane 120 exchanges network signaling and user data with UE 101 over RAN 110. Network user-plane 120 transfers session data that characterizes the user data transfer to network control-plane 130. Network control-plane 130 transfers the session data to exposure function 140. Exposure function 140 maps the session data into a service delivery event that characterizes the user data transfer based on the subscriptions. The service delivery event indicates the service capability, service delivery, service charge, session detail, network slice, network policy, and user payment indication. Exposure function 140 exposes the service delivery event to user data system 102 to indicate the service capability, delivery, charge, detail, slice, policy, and payment.

Figure 4:
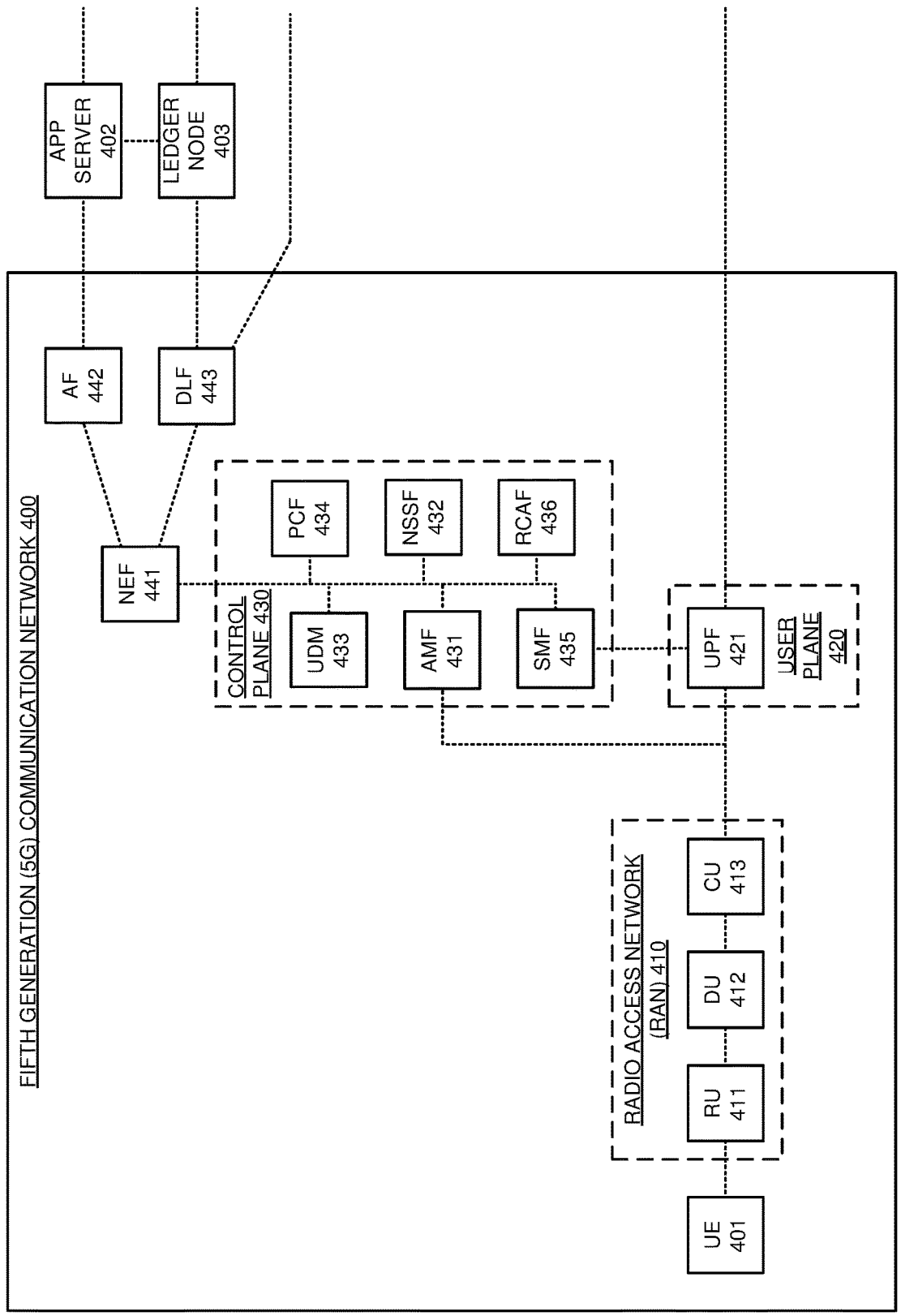
FIG. 4 illustrates a Fifth Generation (5G) communication network to charge a user for a wireless data service over a Network Exposure Function (NEF).

FIG. 4 illustrates Fifth Generation (5G) communication network 400 to charge UE 401 for a wireless data service over Network Exposure Function (NEF) 441. 5G communication network 400 comprises an example of wireless communication network 100, although network 100 may differ. 5G communication network 400 comprises UE 401, Radio Access Network (RAN) 410, user-plane 420, control-plane 430, NEF 441, Application Function (AF) 442, and Distributed Ledger Function (DLF) 443. RAN 110 comprises Radio Unit (RU) 411, Distributed Unit (DU) 412, and Centralized Unit (CU) 413. User-plane 420 comprises User Plane Function (UPF) 420. Control-plane 430 comprises Access and Mobility Management Function (AMF) 431, Network Slice Selection Function (NSSF) 432, Uniform Data Management (UDM) 433, Policy Control Function (PCF) 434, Session Management Function (SMF) 435, and Radio Congestion Capability Function (RCAF) 436.

External app server 402 and AF 442 communicate to securely extend AF functionality to external users. NEF 441 exposes capabilities to AF 442 for services, charging, session detail, payment, and network functionality. AF 442 transfers capability requests to NEF 441 for services, charging, session detail, payment, and network functionality. In response to the service and charging capability requests, NEF 441 exposes service capabilities and corresponding service charges to AF 442. In response to the session detail capability request, NEF 441 exposes available types of session detail to AF 442 like radio quality or user mobility. In response to the payment capability request, NEF 441 exposes available types of payment validation to AF 442. In response to the network capability request, NEF 441 exposes available network policies and available network slices to AF 442. NEF 441 also exposes event subscriptions to AF 442 that are related to services, service delivery, session detail, charging, payment, and network functionality. NEF 441 receives capability requests and event subscriptions from AF 442 for services, service delivery, session detail, charging, payment, and network functionality. NEF 441 translates the requested capabilities into network parameters and initiates the requested event reporting. NEF 441 transfers the network parameters to NSSF 432, UDM 433, PCF 434, and SMF 435.

UE 401 wirelessly attaches to CU 413 over RU 411 and DU 412 in RAN 410. CU 413 transfer attachment signaling for UE 401 to AMF 431. AMF 431 interacts with UDM 433 based on the network parameters from NEF 441 to select wireless data services to deliver the requested service capabilities to UE 401. AMF 431 interacts with NSSF 432 based on the network parameters from NEF 441 to select wireless network slices to deliver the selected wireless data services to UE 401. AMF 431, PCF 434, and SMF 435 interact based on the network parameters from NEF 441 to select policies and Quality-of-Service (QoS) levels for the wireless data services for UE 401. SMF 435 interacts with AMF 435 based on the network parameters from NEF 441 to select UPF 421—and possibly other UPFs—to deliver the selected wireless data services to UE 401. SMF 435 translates the QoS levels and other data into N4 signaling and transfers the N4 signaling to UPF 421—and possibly other UPFs. AMF 431 translates the QoS and other session data into N2 signaling and transfers the N2 signaling to CU 413. CU 413 signals DU 412, RU 411, and UE 401 with instructions to deliver the wireless data services per the policies and QoS levels. AMF 431 and SMF 435 translate the policies, QoS levels, and other session data into N1 signaling and transfer the N1 signaling to UE 401 over RAN 410.

UE 401 and CU 413 exchange user data over RU 411 and DU 412 to deliver the wireless data services per the policies and QoS levels. CU 413 and UPF 421 (and possibly other UPFs) exchange the user data to deliver the wireless data services per the policies and QoS levels. UPF 421 (and possibly other UPFs) exchange the user data with external data systems to deliver the wireless data service per the policies and QoS levels. UE 401, RU 411, DU 412, and CU 413 generate and transfer session data like radio quality, UE mobility, data throughput, data error rate, and the like to SMF 435 over N2/N1 signaling and AMF 431. SMF 435, AMF 431, and UPF 421 generate session data like data throughput, data amount, session endpoints, slice, policy, security applications, and the like. SMF 435 forwards the session data to NEF 441.

NEF 441 maps the session data into service delivery events that characterize the user data transfers. The service delivery event indicates the delivered service capabilities and delivery times. The service charge events indicates the cost, and the payment events indicate payment receipts. The slice and policy events indicate the slices and policies that were used for the wireless data services. The session detail event indicates metadata like radio quality, UE mobility, data throughput, error rate, data amount, session endpoints, and security applications. NEF 441 exposes the service delivery events to AF 442 to indicate the: requested service capabilities, service deliveries, service charges, payment indications, slices, policies, and session details like radio quality, UE mobility, wireless throughput, error rate, data amount, data type, session endpoints, and security applications. AF 442 securely transfers the service delivery events to app server 402. NEF 441 also exposes the service delivery events to DLF 443.

DLF 443, ledger node 403, and other distributed ledger nodes form a distributed ledger that processes and stores the service delivery events. DLF 443 securely communicates with ledger node 403 and the other distributed ledger nodes to process the service delivery events and to propose and execute ledger transactions. DLF 443, ledger node 403, and the other ledger nodes execute the ledger transactions and build consensus on the transaction results. DLF 443, ledger node 403, and the other ledger nodes each store the service delivery events and the ledger transaction results in a blockchain format that includes a hash of the previous block which is typically the previous service delivery event. Thus, the distributed ledger immutably stores data like the service capability, service delivery, service charge, payment indication, slice, policy, radio quality, UE mobility, wireless throughput, error rate, data amount, data type, session endpoints, and security applications. NEF 441 may access the distributed ledger blocks in DLF 443. App server 402 may access the distributed ledger blocks in ledger node 403.

Figure 5:
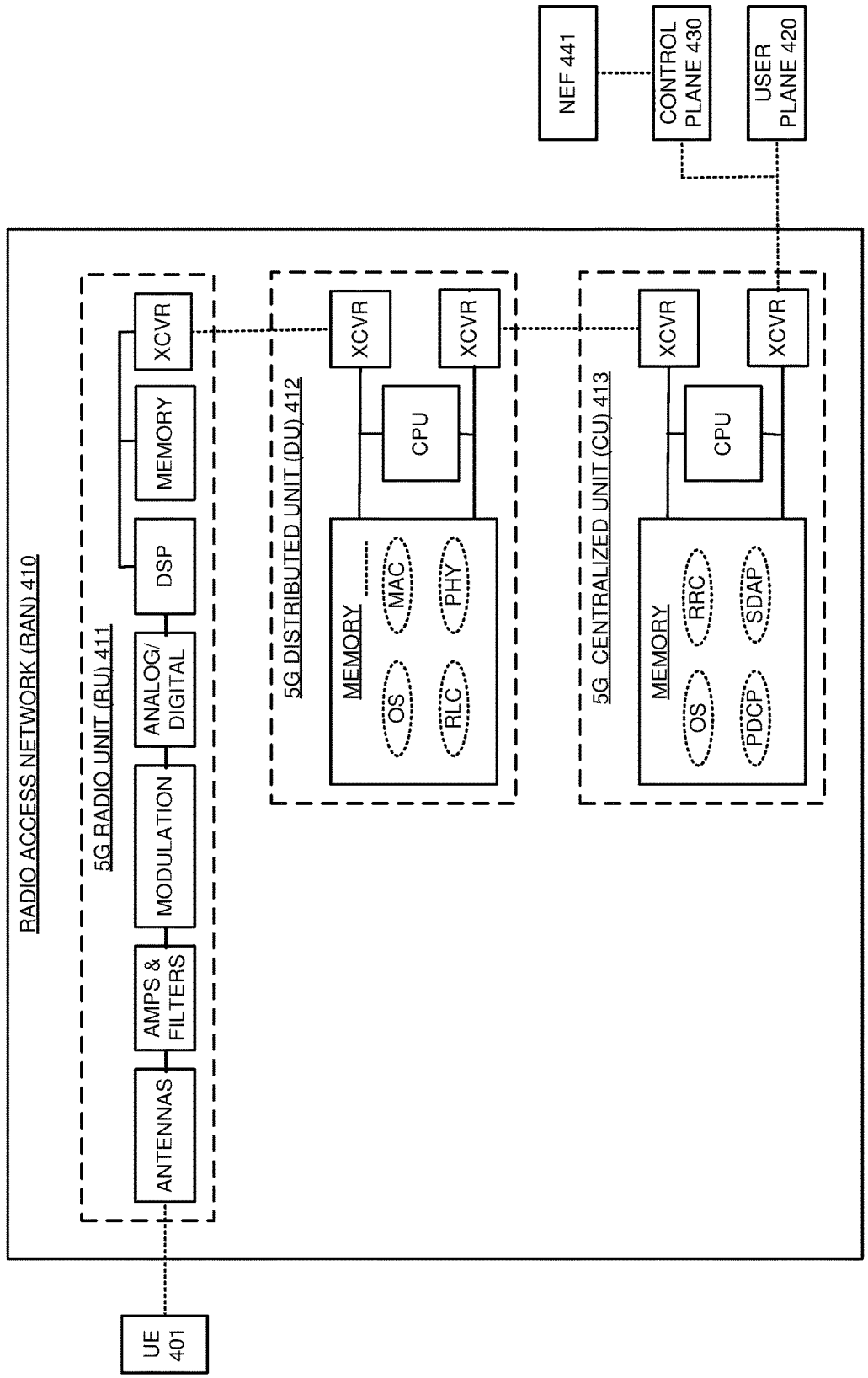
FIG. 5 illustrates a Radio Access Network (RAN) in the 5G communication network that charges the user for the wireless data service over the NEF.

FIG. 5 illustrates Radio Access Network (RAN) 410 in the 5G communication network that charges UE 401 for the wireless data service over NEF 441. RAN 410 comprises an example of RAN 110, although RAN 110 may differ. RAN 410 comprises 5G Radio Unit (RU) 411, 5G Distributed Unit (DU) 412, and 5G Centralized Unit (CU) 413. RU 411 comprises antennas, amplifiers, filters, modulation, analog-to-digital interfaces, DSP, memory, and transceivers (XCVRs) that are coupled over bus circuitry. DU 412 comprises memory, CPU, and transceivers that are coupled over bus circuitry. The memory in DU 412 stores operating systems and 5GNR network applications like Physical Layer (PHY), Media Access Control (MAC), and Radio Link Control (RLC). CU 413 comprises memory, CPU, and transceivers that are coupled over bus circuitry. The memory in CU 413 stores an operating system and network applications like Packet Data Convergence Protocol (PDCP), Service Data Adaptation Protocol (SDAP), and Radio Resource Control (RRC).

UE 401 is wirelessly coupled to the antennas in RU 411 over 5GNR links. Transceivers in RU 411 are coupled to transceivers in DU 412 over fronthaul links like enhanced Common Public Radio Interface (eCPRI). Transceivers in DU 412 are coupled to transceivers in CU 413 over mid-haul links. Transceivers in CU 413 are coupled to user-plane 420 and control-plane 430 over backhaul links. The DSP in RU 411 executes an operating system and radio applications to exchange 5GNR signals with UE 401 and to exchange 5GNR data units with DU 412. The CPU in DU 412 executes an operating system and PHY, MAC, and RLC to exchange 5GNR data units with RU 412 and to exchange 5GNR data units with CU 413. The CPU in CU 413 executes an operating system and PDCP, SDAP, and RRC to exchange 5G signaling and data with user-plane 420 and control-plane 430.

On the uplink, the antennas receive wireless signals from UE 401 transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSP. The DSP transfers corresponding 5GNR symbols to DU 412 over the transceivers. The PHY, MAC, and RLC in DU 412 process the uplink 5GNR symbols to generate Service Data Units (SDUs) which are transferred to the PDCP in CU 413. In CU 413, the PDCP, SDAP, and RRC process the uplink SDUs and the downlink 5G signaling and data to generate uplink 5G signaling and data and downlink SDUs. The RRC exchanges N2/N1 signaling with AMF 431 in control-plane 430. The SDAP exchanges N3 data with UPF 421 in user-plane 420.

On the downlink, the PDCP in CU 413 transfers downlink SDUs to the RLC in DU 412. The RLC, MAC, and PHY process the downlink SDUs to generate downlink 5GNR symbols. The PHY in DU 412 transfers the downlink 5GNR symbols to the DSP in RU 411. The DSP receives downlink 5GNR symbols from DU 412. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data.

RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

The RRC in UE 401 attaches to the RRC in CU 413 over RU 411 and DU 412 in RAN 410. The RRC in CU 413 transfers attachment signaling for UE 401 to AMF 431 in control-plane 430. The RRC in CU 413 receives N2 signaling from AMF 431 in control-plane 430 that indicates UE session context. The RRC in CU 413 drives DU 412 and RU 411 to deliver the wireless data service to UE 401 per the UE session context. The RRC in CU 413 signals UE 401 to use the wireless data service from RU 411 per the UE context. AMF 431 and SMF 435 translate the QoS and other data into N1 signaling and transfer the N1 signaling to UE 401 over RAN 410. The SDAP in UE 401 and the SDAP in CU 413 exchange user data over RU 411 and DU 412 to deliver the wireless data service per the QoS in the UE context. The SDAP in CU 413 and UPF 421 in user-plane 420 exchange the user data to deliver the wireless data service per the QoS. UE 401, RU 411, DU 412, and CU 413 generate session data like radio quality, UE mobility, data throughput, data error rate, and the like. The RRC in UE 401 transfers its session data to the RRC in CU 413 over RU 411 and DU 412. RU 411 and DU 412 also forward their session data to the RRC in CU 413. The RRC in CU 413 transfers the session data to SMF 435 in control-plane 430 over N2 signaling through AMF 431.

Figure 6:
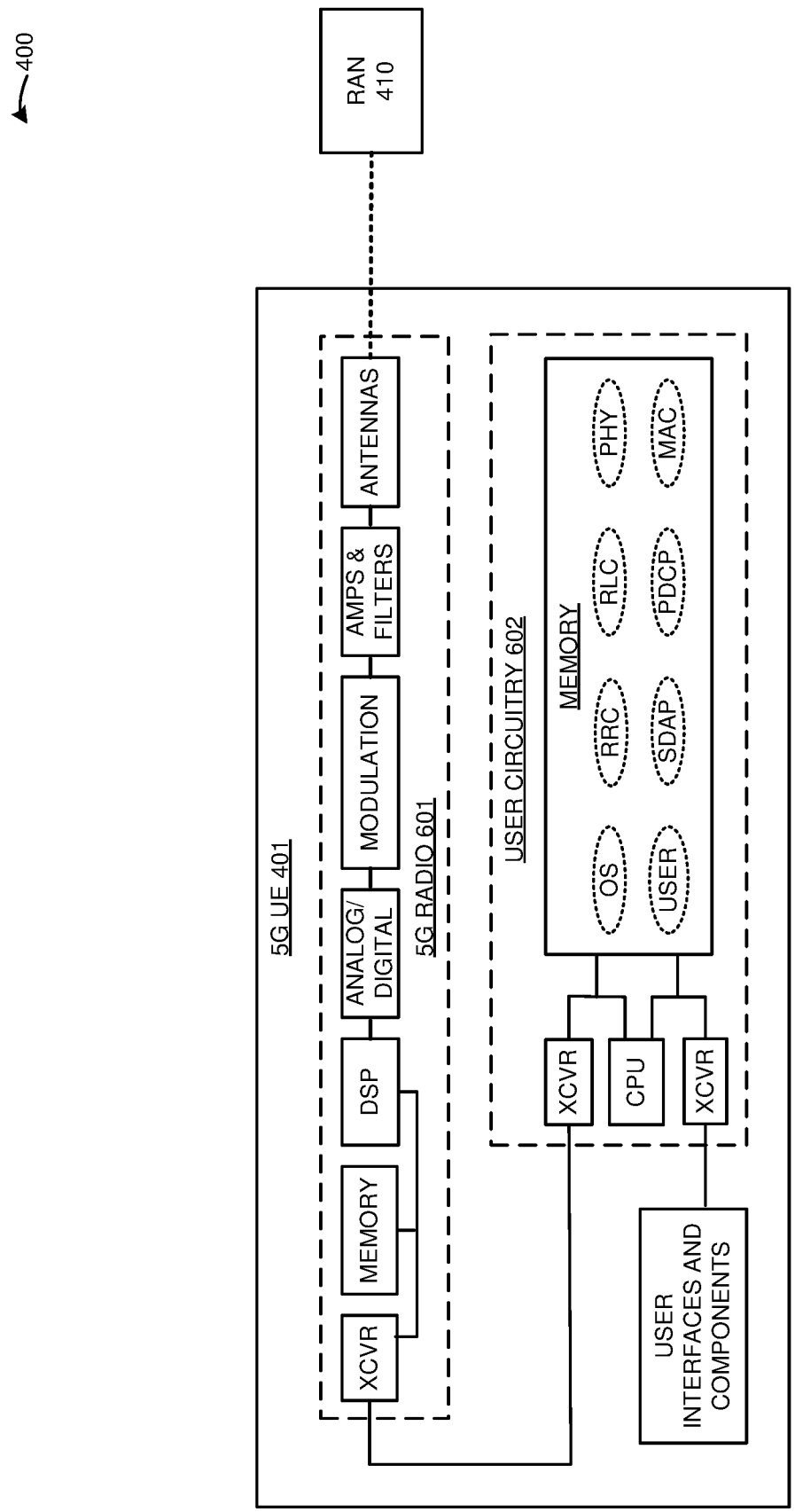
FIG. 6 illustrates a 5G User Equipment (UE) in the 5G communication network that charges the user for the wireless data service over the NEF.

FIG. 6 illustrates 5G User Equipment (UE) 401 in 5G communication network 400 that charges UE 401 for the wireless data service over NEF 441. UE 401 comprises an example of UE 101, although UE 101 may differ. UE 401 comprises 5GNR radio 601 and user circuitry 602. 5GNR radio 601 comprises antennas, amplifiers, filters, modulation, analog-to-digital interfaces, DSP, memory, and transceivers that are coupled over bus circuitry. User circuitry 602 comprises memory, CPU, user interfaces and components, and transceivers that are coupled over bus circuitry. The memory in user circuitry 602 stores an operating system, user applications (USER), and 5GNR network applications for PHY, MAC, RLC, PDCP, SDAP, and RRC. The antennas in 5GNR radio 601 are wirelessly coupled to 5G RAN 510 over a carrier frequency band. A transceivers in 5GNR radio 601 is coupled to a transceiver in user circuitry 602. A transceiver in user circuitry 602 is typically coupled to user interfaces and components like displays, controllers, and memory. The CPU in user circuitry 602 executes the operating system, PHY, MAC, RLC, PDCP, SDAP, and RRC to exchange 5GNR signaling and data with 5G RAN 510 over 5GNR radio 601.

In 5GNR radio 601, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 602 over the transceivers. In user circuitry 602, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data. In 5GNR radio 601, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

Figure 7:
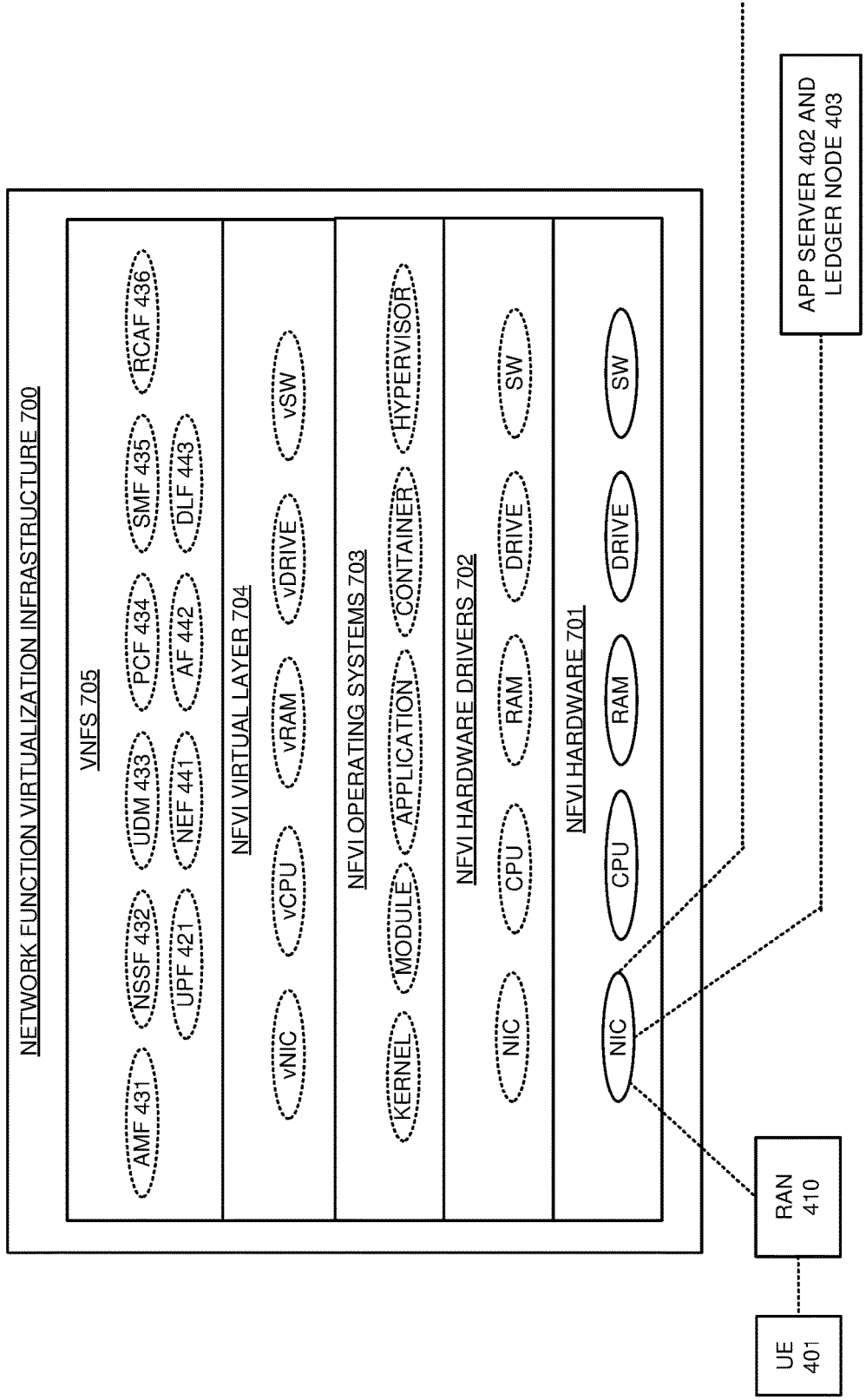
FIG. 7 illustrates a 5G Network Function Virtualization Infrastructure (NFVI) in the 5G communication network that charges the user for the wireless data service over the NEF.

FIG. 7 illustrates 5G Network Function Virtualization Infrastructure (NFVI) 700 in 5G communication network 400 that charges the UE 401 for the wireless data service over NEF 441. NFVI 700 comprises an example of user-plane 120, control-plane 130, exposure function 140, although user-plane 120, control-plane 130, exposure function 140 may differ. NFVI 700 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise UPF 421, AMF 431, NSSF 432, UDM 433, PCF 434, SMF 435, RCAF 435, NEF 441, AF 442, and DLF 443. Other VNFs like Authentication Server Function (AUSF) and Network Repository Function (NRF) are typically present but are omitted for clarity. NFVI 700 may be located at a single site or be distributed across multiple geographic locations. The NIC in NFVI hardware 701 are coupled to RAN 410, app server 402, ledger node 403, and other external systems. NFVI hardware 701 executes NFVI hardware drivers 702, NFVI operating systems 703, NFVI virtual layer 704, and NFVI VNFs 705 to serve UE 401 over 5G RAN 410.

Figure 8:
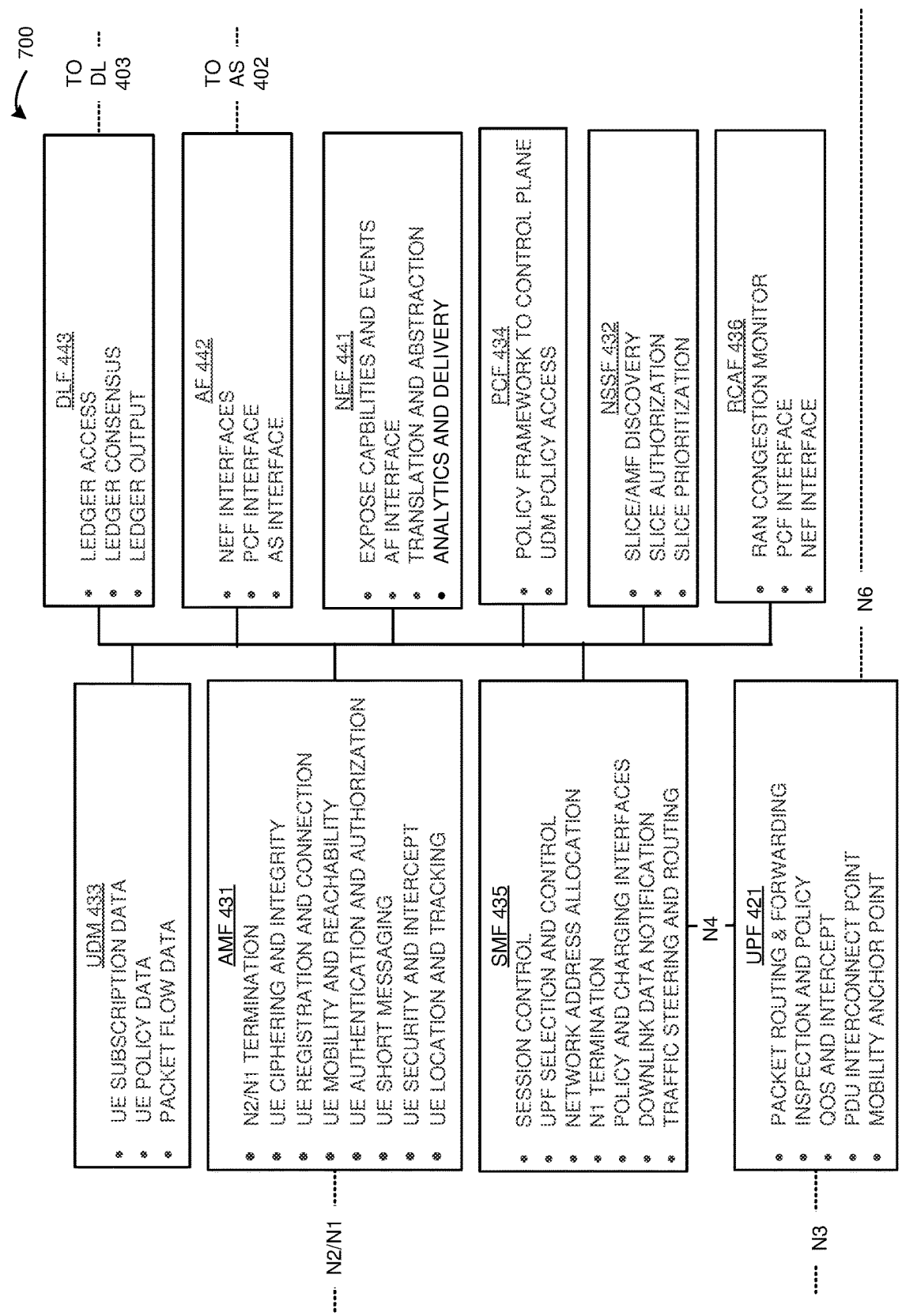
FIG. 8 further illustrates the 5G NFVI in the 5G communication network that charges the user for the wireless data service over the NEF.

FIG. 8 further illustrates 5G NFVI 700 to charge UE 401 user for the wireless data service over NEF 441. UPF 421 performs packet routing & forwarding, packet inspection, QoS handling, PDU interconnection, and mobility anchoring. AMF 431 performs N2/N1 termination, N1 ciphering & integrity protection, UE registration, SMF/PCF selection, UE connection/mobility management, UE authentication and authorization, UE security management, and tracking area updates. NSSF 432 performs slice discovery, AMF discovery, slice authorization, and slice prioritization. User Data Management (UDM) 433 handles UE context, UE subscription data, and UE authentication keys. Policy Control Function (PCF) 434 distributes UE policies to the control plane based on the requesting network function. PCF 434 gives UDM 433 access to policy data. SMF 435 performs session establishment/management, network address allocation, N1 termination, downlink data notification, and traffic steering and routing. RCAF 436 monitors congestion in RAN 410 and transfers RAN status to PCF 434 and NEF 441. NEF 441 exposes network capabilities and events to AFs, translates and abstracts data, and feeds data analytics. AF 442 securely interfaces external app server 402 to network functions like PCF 434, NEF 441, UDM 433, and RCAF 436. DLF 443 and ledger node 403 each comprise a distributed ledger node that handles ledger access, consensus, and output. DU 443 and ledger node 403 store ledger transactions in a blockchain format.

Figure 9:
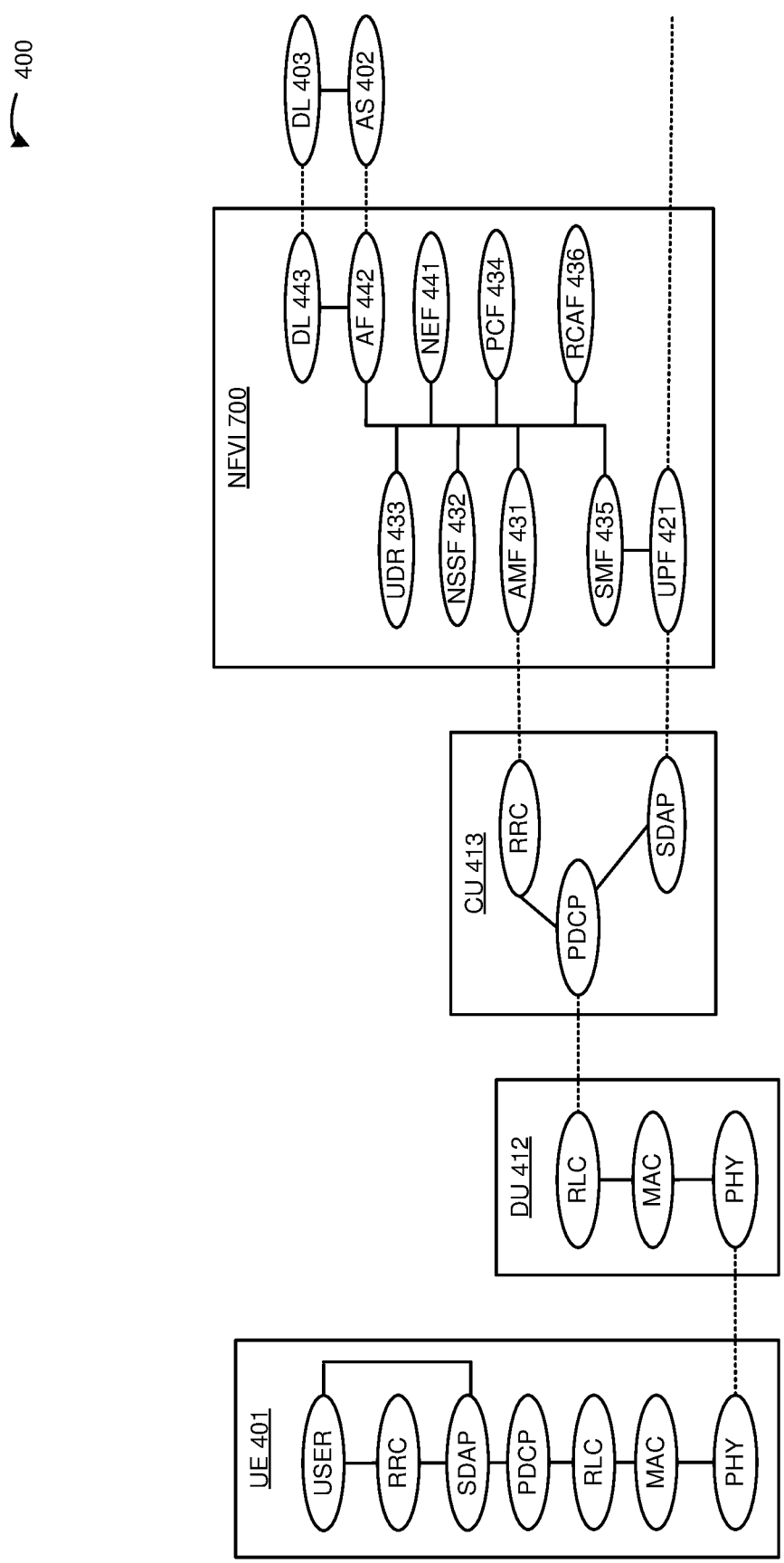
FIG. 9 illustrates the operation of the 5G communication network to charge the user for the wireless data service over the NEF.

FIG. 9 illustrates the operation of 5G communication network 400 to charge UE 401 for the wireless data service over NEF 441. The operation is exemplary and may vary in other examples. External app server (AS) 402 and AF 442 communicate to securely extend AF functionality to external users. NEF 441 exposes capabilities to AF 442 for services, charging, session detail, payment, and network functionality. AF 442 transfers capability requests to NEF 441 for services, charging, session detail, payment, and network functionality. In response to the service and charging capability requests, NEF 441 exposes service capabilities and corresponding service charges to AF 442. In response to the session detail capability request, NEF 441 exposes available types of session detail to AF 442 like radio quality or user mobility. In response to the payment capability request, NEF 441 exposes available types of payment validation to AF 442. In response to the network capability request, NEF 441 exposes available network policies and available network slices to AF 442. NEF 441 also exposes event subscriptions to AF 442 that are related to services, service delivery, session detail, charging, payment, and network functionality. NEF 441 receives capability requests and event subscriptions from AF 442 for services, service delivery, session detail, charging, payment, and network functionality. NEF 441 translates the requested capabilities into network parameters and initiates the requested event reporting. NEF 441 transfers the network parameters to NSSF 432, UDM 433, PCF 434, and SMF 435.

The RRC in UE 401 attaches to the RRC in CU 413. The RRC in CU 413 transfers attachment signaling for UE 401 to AMF 431. AMF 431 interacts with UDM 433 based on the network parameters from NEF 441 to select wireless data services to deliver the requested service capabilities to UE 401. AMF 431 interacts with NSSF 432 based on the network parameters from NEF 441 to select wireless network slices to deliver the selected wireless data services to UE 401. AMF 431, PCF 434, and SMF 435 interact based on the network parameters from NEF 441 to select policies and Quality-of-Service (QoS) levels for the wireless data services for UE 401. SMF 435 interacts with AMF 435 based on the network parameters from NEF 441 to select UPF 421—and possibly other UPFs—to deliver the selected wireless data services to UE 401. UE context comprises UE identifier, addresses, QoS, network names, slices, policies, and the like. SMF 435 transfers the UE context in N4 signaling to UPF 421—and possibly other UPFs. AMF 431 transfers the UE context in N2 signaling to the RRC in CU 413. The RRC in CU 413 signals DU 412, RU 411, and UE 401 with instructions to deliver the wireless data services per the UE context. AMF 431 and SMF 435 transfer the UE context to the RRC in UE 401 in N1 signaling over RAN 410. The SDAP in UE 401 and the SDAP in CU 413 exchange user data deliver the wireless data services per the UE context. CU 413 and UPF 421 (and possibly other UPFs) exchange the user data to deliver the wireless data service per the UE context. UPF 421 exchanges the user data with external data systems to deliver the wireless data service per the UE context.

The network applications (RRC, SDAP, PDCP, RLC, MAC, PHY) in UE 401, DU 412, and CU 413 generate and transfer session data (radio quality, UE mobility, data throughput, data error rate) to SMF 435 over N2/N1 signaling through AMF 431. SMF 435, AMF 431, and UPF 421 generate session data like data throughput, data amount, session endpoints, slice, policy, security applications, and the like. AMF 431 and UPF 421 forward their session data to SMF 435. SMF 435 forwards all of this session data to NEF 441.

NEF 441 maps the session data into service delivery events that characterize the user data transfers. The service delivery event indicates the delivered service capabilities and delivery times. The service charge events indicates the cost, and the payment events indicate payment receipts. The slice and policy events indicate the slices and policies that were used for the wireless data services. The session detail event indicates metadata like radio quality, UE mobility, data throughput, error rate, data amount, session endpoints, and security applications. NEF 441 exposes the service delivery events to AF 442 to indicate the: requested service capabilities, service deliveries, service charges, payment indications, slices, policies, and session details like radio quality, UE mobility, wireless throughput, error rate, data amount, data type, session endpoints, and security applications. AF 442 securely transfers the service delivery events to app server 402. NEF 441 also exposes the service delivery events to DLF 443.

DLF 443, ledger node 403, and other distributed ledger nodes form a distributed ledger that processes and stores the service delivery events. DLF 443 securely communicates with ledger node 403 and the other distributed ledger nodes to process the service delivery events and to propose and execute ledger transactions. DLF 443, ledger node 403, and the other ledger nodes execute the ledger transactions and build consensus on the transaction results. DLF 443, ledger node 403, and the other ledger nodes each store the service delivery events and the ledger transaction results in a blockchain format that includes a hash of the previous block which is typically the previous service delivery event. Thus, the distributed ledger immutably stores data like the service capability, service delivery, service charge, payment indication, slice, policy, radio quality, UE mobility, wireless throughput, error rate, data amount, data type, session endpoints, and security applications. NEF 441 may access the distributed ledger blocks in DLF 443. App server 402 may access the distributed ledger blocks in ledger node 403.

The wireless data network circuitry described above comprises computer hardware and software that form special-purpose network circuitry to charge users for wireless data services over exposure functions. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to charge users for wireless data services over exposure functions.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to charge a user for a wireless data service, the method comprising:
   a Network Exposure Function (NEF) exposing a service charge for the wireless data service to the user;
   the NEF receiving a user request from the user for the wireless data service at the service charge;
   the NEF directing a wireless communication network to deliver the wireless data service to the user in response to the user request;
   the NEF receiving network data from the wireless communication network that indicates a delivery of the wireless data service to the user, an error rate for the wireless data service, and a throughput for the wireless data service; and
   the NEF exposing service data to the user in response to the network data, wherein the service data characterizes the delivery of the wireless data service, indicates the service charge, indicates the error rate, and indicates the throughput.

2. The method of claim 1 wherein:
   the NEF receiving the network data from the wireless communication network comprises receiving an indication of a wireless network slice for the wireless data service; and
   the NEF exposing the service data to the user comprises indicating the wireless network slice for the wireless data service.

3. The method of claim 1 wherein:
   the NEF receiving the network data from the wireless communication network comprises receiving an indication of a wireless network policy for the wireless data service; and
   the NEF exposing the service data to the user comprises indicating the wireless network policy for the wireless data service.

4. The method of claim 1 wherein:
   the NEF receiving the network data from the wireless communication network comprises receiving an indication of a radio quality for the wireless data service; and
   the NEF exposing the service data to the user comprises indicating the radio quality for the wireless data service.

5. The method of claim 1 wherein:
   the NEF receiving the network data from the wireless communication network comprises receiving an indication of a security application for the wireless data service; and
   the NEF exposing the service data to the user comprises indicating the security application for the wireless data service.

6. The method of claim 1 wherein:
   the NEF receiving the network data from the wireless communication network comprises receiving an indication of session endpoints for the wireless data service; and
   the NEF exposing the service data to the user comprises indicating the session endpoints for the wireless data service.

7. The method of claim 1 wherein:
   the NEF receiving the network data from the wireless communication network comprises receiving an indication of user mobility for the wireless data service; and
   the NEF exposing the service data to the user comprises indicating the user mobility for the wireless data service.

8. The method of claim 1 wherein:
   the NEF receiving the network data from the wireless communication network comprises receiving an indication of a data type for the wireless data service; and
   the NEF exposing the service data to the user comprises indicating the data type for the wireless data service.

9. The method of claim 1 wherein:
   the NEF receiving the network data from the wireless communication network comprises receiving an indication of a data amount for the wireless data service; and
   the NEF exposing the service data to the user comprises indicating the data amount for the wireless data service.

10. The method of claim 1 wherein the delivery of the wireless data service to the user comprises the delivery of the wireless data service to a vehicle of the user.

11. The method of claim 1 where the delivery of the wireless data service to the user comprises the delivery of the wireless data service to a sensor of the user.

12. The method of claim 1 where the delivery of the wireless data service to the user comprises the delivery of the wireless data service to a robot of the user.

13. A method of operating a wireless communication network to charge a user for a wireless data service, the method comprising:
   a Network Exposure Function (NEF) transferring a service charge for the wireless data service to an Application Function (AF);
   the AF receiving the service charge for the wireless data service from the NEF and transferring the service charge for the wireless data service to a user Application Server (AS);
   the AF receiving a user request for the wireless data service at the service charge from the user AS and transferring the user request for the wireless data service at the service charge to the NEF;
   the NEF receiving the user request for the wireless data service at the service charge from the AF and signaling one or more network functions to deliver the wireless data service to a User Equipment (UE);
   the NEF receiving network data from the one or more network functions that indicates a delivery of the wireless data service to the UE, an error rate for the wireless data service, and a throughput for the wireless data service and transferring service data to the AF that characterizes the delivery of the wireless data service to the UE, that indicates the service charge, indicates the error rate, and indicates the throughput; and
   the AF receiving the service data from the NEF that characterizes the delivery of the wireless data service to the UE, that indicates the service charge, indicates the error rate, and indicates the throughput and transferring the service data to the user AS that characterizes the delivery of the wireless data service to the UE, that indicates the service charge, indicates the error rate, and indicates the throughput.

14. The method of claim 13 wherein the service data that characterizes the delivery of the wireless data service to the UE indicates at least one of a slice, policy, radio quality, and security application for the wireless data service.

15. The method of claim 14 wherein the delivery of the wireless data service to the UE comprises the delivery of the wireless data service to one of a vehicle, sensor, and robot.

16. A wireless communication network to charge a user for a wireless data service, the wireless communication network comprising:
   a Network Exposure Function (NEF) to transfer a service charge for the wireless data service to an Application Function (AF);
   the AF to receive the service charge for the wireless data service from the NEF and transfer the service charge for the wireless data service to a user Application Server (AS);
   the AF to receive a user request for the wireless data service at the service charge from the user AS and transfer the user request for the wireless data service at the service charge to the NEF;
   the NEF to receive the user request for the wireless data service at the service charge from the AF and signal one or more network functions to deliver the wireless data service to a User Equipment (UE);
   the NEF to receive network data from the one or more network functions that indicates delivery of the wireless data service to the UE, an error rate for the wireless data service, and a throughput for the wireless data service and transfer service data to the AF that characterizes the delivery of the wireless data service to the UE, that indicates the service charge, indicates the error rate, and indicates the throughput; and
   the AF to receive the service data from the NEF that characterizes the delivery of the wireless data service to the UE, that indicates the service charge, indicates the error rate, and indicates the throughput and transfer the service data to the user AS that characterizes the delivery of the wireless data service to the UE, that indicates the service charge, indicates the error rate, and indicates the throughput.

17. The wireless communication network of claim 16 wherein the service data that characterizes the delivery of the wireless data service to the UE indicates at least one of a slice, policy, radio quality, and security application for the wireless data service.

18. The wireless communication network of claim 17 wherein the delivery of the wireless data service to the UE comprises the delivery of the wireless data service to one of a vehicle, sensor, and robot.

19. The method of claim 13 wherein the NEF signaling the one or more network functions to deliver the wireless data service to the UE comprises the NEF signaling one or more of a Network Slice Selection Function (NSSF), a Unified Data Management (UDM), a Policy Control Function (PCF), and a Session Management function (SMF) to deliver the wireless data service to the UE.

20. The wireless communication network of claim 16 wherein the one or more network functions comprise one or more of a Network Slice Selection Function (NSSF), a Unified Data Management (UDM), a Policy Control Function (PCF), and a Session Management function (SMF).

* * * * *